United States Patent
Mangano et al.

[11] Patent Number: 6,038,859
[45] Date of Patent: Mar. 21, 2000

[54] HYDRAULIC FLUID CIRCUIT HAVING A HYDRAULIC MOTOR AND A THREE-POSITION SELECTOR FOR SELECTING THE CIRCULATION OF FLUID

[75] Inventors: Alain Mangano, Vieux Moulin; Bernard Allart, Crepy-en-Valois; Louis Bigo, Compiegne; Michel Garczarek, Borest; Yannick Ethet, Neuilly-Sous-Clermont; Joël Crave, Remy; Philippe Peignon, Franconville, all of France

[73] Assignee: Poclain Hydraulics Industrie, Verberie Cedex, France

[21] Appl. No.: 09/309,900

[22] Filed: May 11, 1999

[30] Foreign Application Priority Data

May 13, 1998 [FR] France .................................. 98 06020

[51] Int. Cl.⁷ ....................................................... F16D 31/02
[52] U.S. Cl. .................................. 60/436; 60/441; 60/442
[58] Field of Search .............................. 60/436, 441, 442, 60/460; 91/44

[56] References Cited

U.S. PATENT DOCUMENTS 4,615,174  10/1986  Nagahara .................................. 60/442
4,720,975  1/1988   Gunter ..................................... 60/442
5,531,071  7/1996   Asano ...................................... 60/441
5,709,083  1/1998   Sorbel .

FOREIGN PATENT DOCUMENTS 0284956   10/1988  European Pat. Off. .
55-139505 10/1980  Japan .
70757     5/1982   Japan ..................................... 60/441
59-052028 3/1984   Japan .

Primary Examiner—F. Daniel Lopez
Attorney, Agent, or Firm—Ladas & Parry

[57] ABSTRACT

This invention relates to a hydraulic fluid circuit comprising a reversible hydraulic motor, a braking device, two principal conduits respectively connected to the two principal supply and exhaust ports of the motor, a principal selector adapted to occupy a position of rest and two active positions in order to select the circulation of the fluid between the principal ports of the motor and the principal conduits to which they are connected. The circuit also comprises an intermediate system of selection capable of occupying a first configuration in which the principal selector is maintained in its position of rest and a second configuration in which the principal selector is allowed to leave its position of rest. The control means of the intermediate system of selection are connected to the braking device so that this intermediate system can pass from its first to its second configuration only when the brake is de-activated.

20 Claims, 5 Drawing Sheets

HYDRAULIC FLUID CIRCUIT HAVING A HYDRAULIC MOTOR AND A THREE-POSITION SELECTOR FOR SELECTING THE CIRCULATION OF FLUID

FIELD OF THE INVENTION

The present invention relates to a hydraulic fluid circuit comprising:

a reversible hydraulic motor comprising a stator and a rotor, in particular of the type used for driving the members for displacing a machine in translation, said motor having two principal ports respectively intended to serve for supply and exhaust of fluid, a device for immobilization of the rotor of the motor which comprises at least one immobilization member and means for urging said member into an active position in which the rotor is immobilized and into an inactive position in which the rotor is free to rotate with respect to the stator, hydraulic fluid circulation means, two principal conduits, respectively intended to be connected to each of the two principal ports of the motor to serve as supply and exhaust conduits for the motor when the latter is in operation, a device for selecting the circulation of the fluid between the principal ports of the motor and the principal conduits to which they are respectively connected, this device comprising a principal selector capable of occupying a rest position in which, the fluid pressures in the principal conduits being substantially equal, the circulation of fluid between the principal conduits and the corresponding principal ports is prevented in the sense of exhaust; a first active position in which, the fluid pressure in the first principal conduit being greater than the fluid pressure in the second principal conduit, the circulation of fluid between the first principal conduit and the first principal port is allowed in the sense of supply while the circulation of fluid between the second principal conduit and the second principal port is allowed in the sense of exhaust; and a second active position in which, the fluid pressure in the first principal conduit being less than the fluid pressure in the second principal conduit, the circulation of fluid between the first principal conduit and the first principal port is allowed in the sense of exhaust while the circulation of fluid between the second principal conduit and the second principal port is allowed in the sense of supply, the selection device further comprising means for controlling the displacement of the principal selector between its three positions.

BACKGROUND OF THE INVENTION

The hydraulic motor may be of the rotating casing or rotating shaft type. It has two directions of rotation, i.e., depending on the principal port which is chosen for supply and that which is chosen for exhaust, the rotor may rotate with respect to the stator in the two opposite directions of rotation. Furthermore, the motor is reversible and, in one of its directions of rotation, it is capable of functioning as a pump, for example when the vehicle is descending a slope. It may be question of a slow motor (low speed and high torque) or of a fast motor. The motor used in such a circuit is intended to ensure drive of the members (for example tracks) for displacing machines such as hydraulic shovels in tmnslation.

The means for circulating hydraulic fluid conventionally comprise one or more pumps. The circuit may be an open circuit in which a pump with one sole outlet is used for supplying the principal conduit which serves for supply, while the conduit which serves for exhaust is connected to a reservoir without pressure. It may also be question of a closed circuit, in which a pump is used, having a high-pressure fluid outlet to supply the supply conduit and a low-pressure fluid inlet connected to the exhaust conduit.

The pump may present fixed or variable capacity. It may have two directions of rotation in order selectively to supply one or the other of the principal conduits. It may also have one sole direction of rotation, in which case a selector of the connection of one or the other of the principal conduits to the outlet of the pump is used. In addition, the circuit may comprise a booster pump which, when the motor is stopped, makes it possible to maintain a so-called booster pressure in the whole of the conduits of the circuit and, when the motor is operating, to maintain the conduits connected to the exhaust at booster pressure.

In the rest position of the principal selector of the device for selecting the circulation of the fluid between the principal ports of the motor and the principal conduits to which they are respectively connected, the circulation of the fluid is prevented in the sense of exhaust from the two principal ports of the motor, so that the latter cannot operate. The principal selector is automatically placed in its rest position when the fluid pressures in the principal conduits are substantially equal. On the other hand, when the principal selector occupies one of its two active positions, the motor may operate in one or the other of its two directions of rotation.

The device for immobilizing the rotor of the motor is generally used as parking brake, which serves to maintain the motor stopped when the supply and exhaust in the principal conduits cease. In particular, at stop, the pressures in the principal conduits are substantially equal and the principal selector occupies its rest position, while the immobilization member occupies its active position. Of course, this immobilization member must occupy its inactive position for the motor to function under good conditions.

With certain earlier motors, it was provided to actuate the immobilization device separately to place the immobilization member in its inactive position and to set the motor in action, respectively generating a supply and an exhaust of fluid in each of the two principal conduits.

In order to avoid poor manipulations, it was then thought to render the brake de-activation control automatic. In this way, in certain circuits, the immobilization member is automatically urged from its active position to its inactive position when the circulation of fluid supplying one of the principal conduits and allowing exhaust in the other conduit, begins. Applicants have observed that this system was not entirely satisfactory. In effect, with such a system, the immobilization member is urged towards its inactive position at the same time as the supply conduit of the motor is placed under pressure and the exhaust conduit is connected to exhaust, with the result that the rotor already exerts a torque. The fact of inactivating the immobilization member under these conditions may constitute a cause of premature wear of certain elements of the motor, in particular of this immobilization member. Furthermore, this results in a risk of unpleasant jerks when the motor is started up.

It is an object of the present invention to overcome these drawbacks by proposing a circuit which, while allowing an automatic passage of the immobilization member into its inactive position when the motor is started up, causes the principal ports of the motor to be effectively connected to the supply and exhaust conduits only after the immobilization member has been urged towards its inactive position.

SUMMARY OF THE INVENTION

This object is attained in that the means for controlling displacement of the principal selector comprise an intermediate system of selection capable of adopting a first configuration in which the principal selector is maintained in its position of rest and a second configuration in which the principal selector is allowed to leave its position of rest to adopt one or the other of its active positions, as well as two pilot conduits capable of being taken to the same pressure or to different pressures via the intermediate system of selection, the means for controlling the displacement of the principal selector further comprising means for controlling the intermediate system of selection which are connected to the immobilization device so that said intermediate system of selection is allowed to pass from its first to its second configuration only once the immobilization member has been urged towards its inactive position.

In fact, the intermediate system of selection performs the role of a sequence valve which, during circulation of the fluid for starting up the motor, makes it possible to effect the following sequence: firstly, urging of the immobilization member towards its inactive position and, secondly, effective supply and exhaust for the motor. In effect, when the fluid is circulated in the circuit after a stop and a braking of the motor, the principal selector occupying its position of rest and the intermediate system of selection being in its first configuration, it is necessary that the immobilization member pass towards its inactive position for the intermediate system of selection to be able to pass into its second configuration, which then enables the principal selector to leave its position of rest in order effectively to allow the circulation of the fluid through the supply and exhaust conduits of the motor.

Several advantageous variant embodiments for producing the intermediate system of selection are envisaged. They will be described hereinafter with reference to the accompanying drawings.

The means for controlling the intermediate system of selection advantageously comprise at least one control conduit capable of being supplied with fluid to urge the intermediate system of selection from its first configuration into its second configuration. When the means for urging the immobilization member into its inactive position comprise a de-activation jack capable of being supplied with fluid via a de-activation conduit, it is advantageous to provide that this control conduit be supplied with fluid via the de-activation conduit.

Thanks to these arrangements, when the immobilization device is controlled hydraulically, the same hydraulic control line is used for controlling the intermediate system of selection towards its second configuration, which makes it possible to avoid this intermediate system of selection being controlled towards its second configuration independently of the passage of the immobilization member towards its inactive position.

In a variant embodiment, the means for controlling the intermediate system of selection advantageously comprise at least one control member, mechanically connected to the immobilization member and capable of being actuated by said immobilization member in order to urge the intermediate system of selection from its first configuration into its second configuration.

In that case, the passage of the intermediate system of selection towards its second configuration is mechanically connected to the de-activation of the immobilization member.

BRIEF DESCRIPTION OF THE DRAWINGS

The invention will be more readily understood on reading the following detailed description, with reference to the accompanying drawings, in which.

DESCRIPTION OF PREFERRED EMBODIMENTS

Figure 1:
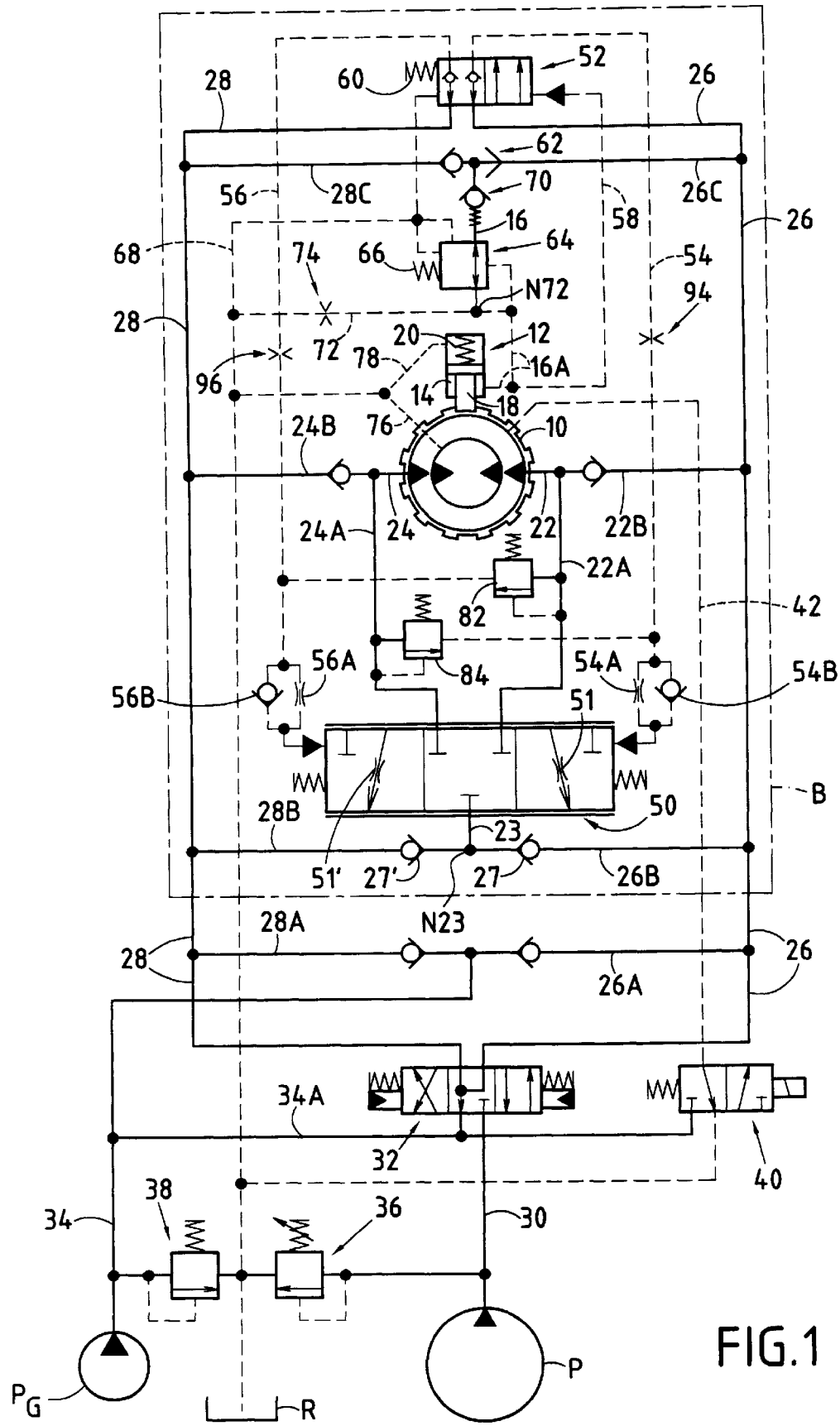
FIG. 1 shows a circuit according to the invention in accordance with a first variant embodiment, and FIGS. 2 to 5 respectively show a second, a third, a fourth and a fifth variant of part of the circuit of FIG. 1.

Referring now to the drawings, the hydraulic motor 10 shown in the Figures by way of example comprises two distinct operational cubic capacities. However, in order to render the drawings clearer, the means for selecting the capacity of this motor have not been shown. However, it must be understood that, if the motor presents two cubic capacities, such means are present, for example in the form of a slide valve for selecting the capacity of the motor, for example of the type disclosed in French Patent No. 2 699 229. The invention is, of course, also applicable to other types of hydraulic motors with one or more cubic capacities.

The immobilization device 12 schematically shown in FIG. 1 is a positive clutch system. The invention is also applicable to motors having other brake systems, for example plate or disc brakes such as the one disclosed in French Patent No. 2 655 091, or brakes incorporating anal teeth such as the one disclosed in French Patent No. 2 644 210.

These brakes conventionally comprise at least a first braking member (for example a first series or teeth or a first series of plates or discs) fast in rotation with the rotor and a second braking member (a second series of teeth or a second series of plates or discs) fast in rotation with the stator. As for the immobilization member, it may be constituted by a piston which, in its active position, urges the braking members so that they cooperate together so as to brake the rotor with respect to the stator and which, in its inactive position, ceases to urge these braking members into braking cooperation, with the result that they may rotate with respect to one another. The immobilization device shown schematically in FIG. 1 thus comprises a de-activation jack of which a de-activation chamber 14 is capable of being supplied with fluid via a de-activation conduit 16 in order to urge the immobilization member constituted by a piston 18 towards its inactive position, against the action of return means such as a spring 20.

The motor 10 comprises two principal ports 22 and 24 respectively, which are intended, one to serve for fluid supply, the other for fluid exhaust.

The circuit comprises two principal conduits 26 and 28 respectively, which are respectively intended to be connected to each of the two principal ports 22 and 24 to perform the role of supply conduits or that of exhaust conduits.

The means for circulation of hydraulic fluid shown in FIG. 1 comprise a principal pump P of which the outlet conduit 30 is connected to a selector 32 to which conduits 26 and 28 are also connected. The fluid-circulation means also comprise a pressure-free reservoir R which allows the return of fluid. In the example shown, the circuit also comprises a booster pump PG which is capable of supplying fluid to a booster conduit 34 in order to generate a booster pressure of the order of some bars, for example 2 to 10 bars.

In order to avoid overpressures in the circuit, the conduit 30 is connected to reservoir R by an adjustable valve 36. The booster conduit 34 is also connected to the reservoir R by a valve 38 adjusted for the booster pressure. The booster conduit 34 is connected to the principal conduits 26 and 28 by secondary conduits 26A and 28A respectively which are equipped with flap valves allowing passage of the fluid only in the direction from the booster conduit towards the principal conduits. This arrangement makes it possible permanently to maintain in the principal conduits a pressure at least equal to the booster pressure.

When the motor is stopped, the selector 32 occupies its intermediate position in which the principal conduits are placed in communication and are both connected to the booster conduit 34 by a secondary conduit 34A. In this way, at stop, the two principal conduits are placed at the booster pressure. On the other hand, when the selector 32 is displaced towards the left in FIG. 1, the conduit 26 is connected to the outlet conduit 30 of the high pressure of the pump P and it serves for supply, while the conduit 28 is isolated from conduit 26 and is connected to the secondary conduit 34A which allows exhaust of the fluid towards reservoir R through the valve 38. When the selector 32 is displaced towards the right in FIG. 1, the situation is reversed, conduit 28 serving for supply, while conduit 26 serves for exhaust. The booster circuit may also serve to control the secondary functions of the motor. In this way, the circuit shown by way of example in FIG. 1 comprises an electrovalve 40 which serves to control the system for selecting the cubic capacity of the motor by a capacity selection control conduit 42 which, depending on the position of the electrovalve 40, may be connected to the reservoir R or to the secondary booster conduit 34A.

In FIG. 1, a unit B has been defined with broken lines, which comprises the motor and the different elements of the circuit (valves, flap valves, selectors . . .) which are advantageously integrated in the casing of the motor. In this way, unit B comprises the principal selector 50 of the device for selecting the circulation of the fluid between the principal ports of the motor and the principal conduits 26 and 28. These latter are connected to the selector 50 by secondary conduits 26B and 28B respectively which are equipped with non-return valves 27, 27' allowing only the circulation of the fluid in the direction from the principal selector towards conduits 26 or 28. More precisely, the conduits 26B and 28B are connected to a conduit 23 at a node N23 located between the valves 27 and 27', and it is this conduit 23 which is connected to the outlet of the selector 50.

The principal ports of the motor are connected to the principal selector by by-pass conduits 22A and 24A respectively. In addition, the principal port 22 is connected to the conduit 26 by a connection conduit 22B which is equipped with a non-return valve allowing only the circulation of the fluid in the sense of supply of the port 22. Similarly, the port 24 is connected to the principal conduit 28 by a connection conduit 24B equipped with a non-return valve allowing only the circulation of the fluids in the sense of supply of port 24.

The principal selector 50 may occupy three particular positions, namely an intermediate rest position and two extreme active positions.

In the rest position, shown in FIG. 1, the two conduits 22A and 24A are isolated and are not connected to any other conduit by the principal selector. Similarly, branch 23 is isolated in the principal selector. In this way, the rotor of the motor cannot rotate since, for the two principal ports 22 and 24 of the motor, circulation is only possible in the sense of supply, but neither of these ports can serve for exhaust of fluid.

On the other hand, when the selector 50 occupies its first active position, in which it is displaced towards the left in FIG. 1, the first principal conduit 26 may serve for supply of the first principal port 22 of the motor, by the connection conduit 22B, while the by-pass conduit 24A is connected to the second principal conduit 28 by the secondary conduit 28B, which allows the exhaust of fluid via the second principal port 24 of the motor.

The situation is the reverse in the second active position of the principal selector 50, in which it is displaced towards the right in FIG. 1.

In order to control displacement of the principal selector 50, an intermediate system of selection is integrated in unit B. In FIG. 1, this intermediate system comprises the intermediate two-position selector 52. The means for controlling displacement of the principal selector 50 also comprise two pilot conduits 54 and 56 which may be selectively placed in communication respectively with the two principal conduits 26 and 28 in order to urge the principal selector towards one or the other of its active positions.

When the intermediate system of selection occupies a first configuration in which the two pilot conduits are placed at the same pressure, the principal selector occupies its position of rest.

On the other hand, when the intermediate system of selection is in a second configuration in which the first pilot conduit 54 is placed in communication with the first principal conduit 26 placed at high pressure, while the second pilot conduit 56 is placed in communication with the second principal conduit 28 which is placed at low pressure, the principal selector 50 may occupy its first active position.

Inversely, still in its second configuration, the intermediate system of selection may allow the second pilot conduit 56 to be connected to the second principal conduit 28 at high pressure and the first pilot conduit to be placed in communication with the first principal conduit 26 which is at low pressure, with the result that the principal selector 50 may occupy its second active position.

The selector 50 is returned against the supply in the pilot conduits 54 and 56 by return means such as springs. It will be noted that, in order to avoid too rapid a passage of the selector 50 from its position of rest towards one or the other of its active positions, the flowrate of fluid in the pilot conduits is limited in the sense of supply by restrictions 54A and 56A. On the other hand, during passage of the principal selector from one of its active positions towards its position of rest, the circulation of fluid in the pilot conduits in the sense of exhaust is effected through the non-return valves 54B and 56B. It should be noted that the opposite solution might be adopted, by managing the speed of displacement of the selector by restrictions active on the draining of the pilot conduits and by reversing the non-return valves 54B and 56B so that they allow circulation of fluid in the sense of supply of the pilot conduits.

The intermediate system of selection is itself controlled between its two configurations by the control means comprising for example a control conduit 58 which, when it is supplied with fluid, urges the intermediate system of selection from its first configuration towards its second configuration, while it is returned into its first configuration by spring 60 whose effect is antagonistic to the pressure of fluid in the conduit 58.

In FIG. 1, the intermediate selector 52 is disposed between the principal conduits 26 and 28 and the pilot conduits 54 and 56. This selector 52 is shown in its first position (i.e. the intermediate system of selection is in its first configuration); the first pilot conduit 54 is connected to the first principal conduit 26 via a non-return valve, with which the selector 52 is equipped and which prevents circulation in the sense of supply of fluid to the pilot conduit 54. Similarly, the conduit 56 is connected to the principal conduit 28 via a non-return valve which prevents circulation of fluid in the sense of supply of the conduit 56.

It may also be provided that the pilot conduits 54 and 56 be totally isolated from the principal conduits 26 and 28 in the first position of the selector 52. However, the circulation of fluid only in the sense of exhaust of the pilot conduits rendered possible in the embodiment of FIG. 1, makes it possible, when the motor is stopped and the two principal conduits are placed at the same booster pressure, for that pilot conduit in which the pressure was the greatest to be able to be "drained" in the principal conduit to which it is connected in the first position of the selector 52 until the pressure in this pilot conduit is equal to the booster pressure. In this way a better balancing of the pressures in the two pilot conduits and a rapid passage of the intermediate selector from the active position that it occupied to its position of rest are obtained (the principal conduit 26 or 28 which was connected to exhaust was itself at the booster pressure when the motor was functioning, with the result that the pilot conduit which was connected thereto was already placed at booster pressure before the passage of the selector 52 from its second position to its first position).

In the example of FIG. 1, the control conduit 58 of the intermediate selector 52 is connected to the de-activation conduit 16 of the immobilization member. The intermediate selector 52 may pass from its first to its second position when the conduit 58 is supplied with fluid, which is possible only when the de-activation conduit 16 is itself supplied with fluid, i.e. when the immobilization member is already urged towards its inactive position. It is therefore only in this situation that the intermediate selector can occupy its second position to allow the pilot conduits 54 and 56 to be respectively connected to the principal conduits 26 and 28. Consequently, if the conduits 26 and 28 serve respectively for supply and exhaust, the pilot conduit 54 may control the principal selector towards its first active position. In the contrary case, it will be the second pilot conduit 56 which will control the principal selector towards its second active position.

Spring 60 and spring 20 are preferably chosen so that the efforts exerted by spring 60 on the intermediate selector 52 when the latter begins to be urged from its first towards its second position, are at least equal to the efforts exerted by the spring 20 on the immobilization member 18 during the whole stroke of the latter from its active position up to its inactive position (these efforts being maximum when the immobilization member attains its inactive position). To that end, it suffices to determine the pre-stresses of these springs correctly.

In this way, when the pressure increases in the section 16A of the conduit 16 and in the control conduit 58, it makes it possible firstly to displace the piston 18 towards its inactive position then, by continuing to increase, it then allows the passage of the intermediate selector 52 (against the effect of the spring 60) into its second position and it is only in this situation that the principal selector can occupy one of its active positions.

The de-activation conduit 16 of the immobilization member is connected to the two principal conduits 26 and 28 by a shuffle valve 62 likewise called circuit selector, of which the inlets are respectively connected to secondary conduits 26C and 28C which by-pass on the conduits 26 and 28 with respect to the intermediate selector 52 and whose outlet is connected to the de-activation conduit 16. In this way, the conduit 16 is automatically connected to that of the principal conduits 26 and 28 which is at the highest pressure, with the result that de-activation of the immobilization member uses the high pressure of the circuit.

Depending on the type of motor used, the maximum supply pressures may attain about 450 bars, in particular when it is question of a "slow" motor, with low speed and high torque. It is not necessary to use such a high pressure to deactivate the immobilization member. Consequently, the circuit of FIG. 1 comprises means for limiting the pressure in the de-activation conduit 16. These means are constituted by a pressure reducer 64 whose return spring 66 is calibrated to sufficient pressures to de-activate the immobilization member (against the effect of spring 20) and to allow the urge of the intermediate selector 52 into its second position (against the effect of spring 60). This reducer 64 is controlled by the pressure in the section 16A of the conduit 16 against the effort of the spring 66 in order, if the pressure in this section 16A becomes too high, to place the latter in communication with an exhaust conduit 68 connected to the reservoir R.

As indicated hereinbefore, the principal conduits are advantageously placed at the same booster pressure when the motor is stopped, as in the case in the situation of FIG. 1. However, it is important that, despite the existence of this booster pressure in the conduits 26 and 28, the immobilization member continues to occupy its active position when the motor has stopped. To that end, the circuit comprises a threshold valve or "calibrated valve" 70 which is intended to allow circulation of fluid in the de-activation conduit 16 in the sense from one of the principal conduits 26 or 28 towards the de-activation chamber of the jack 12, only when the pressure in one of the principal conduits becomes greater than a threshold pressure, at least equal to the booster pressure. In FIG. 1, the threshold valve 70 is constituted by a ball valve returned in the sense of closure by a spring calibrated to the threshold pressure, this valve being disposed in the conduit 16 between the shuttle valve 62 and the pressure reducer 64.

Another solution for rendering the immobilization device insensitive to the booster pressure would consist in choosing the return spring 20 of the immobilization member so that its pre-stress is sufficient for it to withstand the booster pressure in chamber 14.

In order to allow passage of the immobilization member 18 from its active position shown in FIG. 1 to its inactive position, it is necessary to allow draining of the de-activation chamber 14. To that end, a draining conduit 72 is provided, this conduit being connected to the exhaust conduit 68. The circuit comprises means for limiting the flowrate of fluid in the conduit 72 during draining of the chamber 14, these means being for example constituted by a restriction 74. In the example of FIG. 1, the draining conduit 72 is permanently connected (at node N72) to the section 16A of the conduit 16 which lies downstream of the pressure reducer in the sense of supply of the de-activation conduit. In this way, during operation of the motor, the fluid taken from the principal conduit which serves to supply the de-activation conduit also passes in the draining conduit 72. In other words, the permanent connection of the conduit 72 to the section 16A of the conduit 16 is the cause of a permanent leakage during operation of the motor. The presence of the restriction 74 makes it possible to limit this leak, with the result that it does not affect the output of the motor too substantially, it makes it possible to maintain in the de-activation chamber 14 a sufficient pressure to maintain the immobilization member in the inactive position, and it also ensures a sufficient pressure in the conduit 58 to maintain the selector 52 in its second position.

In addition to the draining conduit 72, a conduit 76 for return of leakage of the motor and a conduit 78 for draining the chamber which contains the spring 20, are also connected to the exhaust conduit 68.

A valve 82 connects the by-pass conduit 22A to the pilot conduit 56. In this way, when the motor is operating in the sense of the conduit 26 serving to supply fluid (the selector 50 being displaced towards the left in FIG. 1), if the pressure becomes too high in the by-pass conduit 22A (the spring of the valve 82 being suitably calibrated), the excess fluid pours into the pilot conduit 56 and may thus pilot the selector 50 in the position where the excess fluid in the conduit 22A may flow into the conduit 28. The restriction 96 makes it possible to maintain a sufficient pressure in the conduit 56 upstream of this restriction 96 when the fluid (possibly taken from conduit 22A by the valve 82) circulates in the sense of draining this conduit 56.

Similarly, a valve 84 is disposed between the by-pass conduit 24A and the first pilot conduit, the role of this valve being similar to that of valve 82, but it functions when it is the principal conduit 28 which supplies the motor. The first pilot conduit 54 is equipped with a restriction 94 similar to restriction 96 of the conduit 56.

Figure 2:
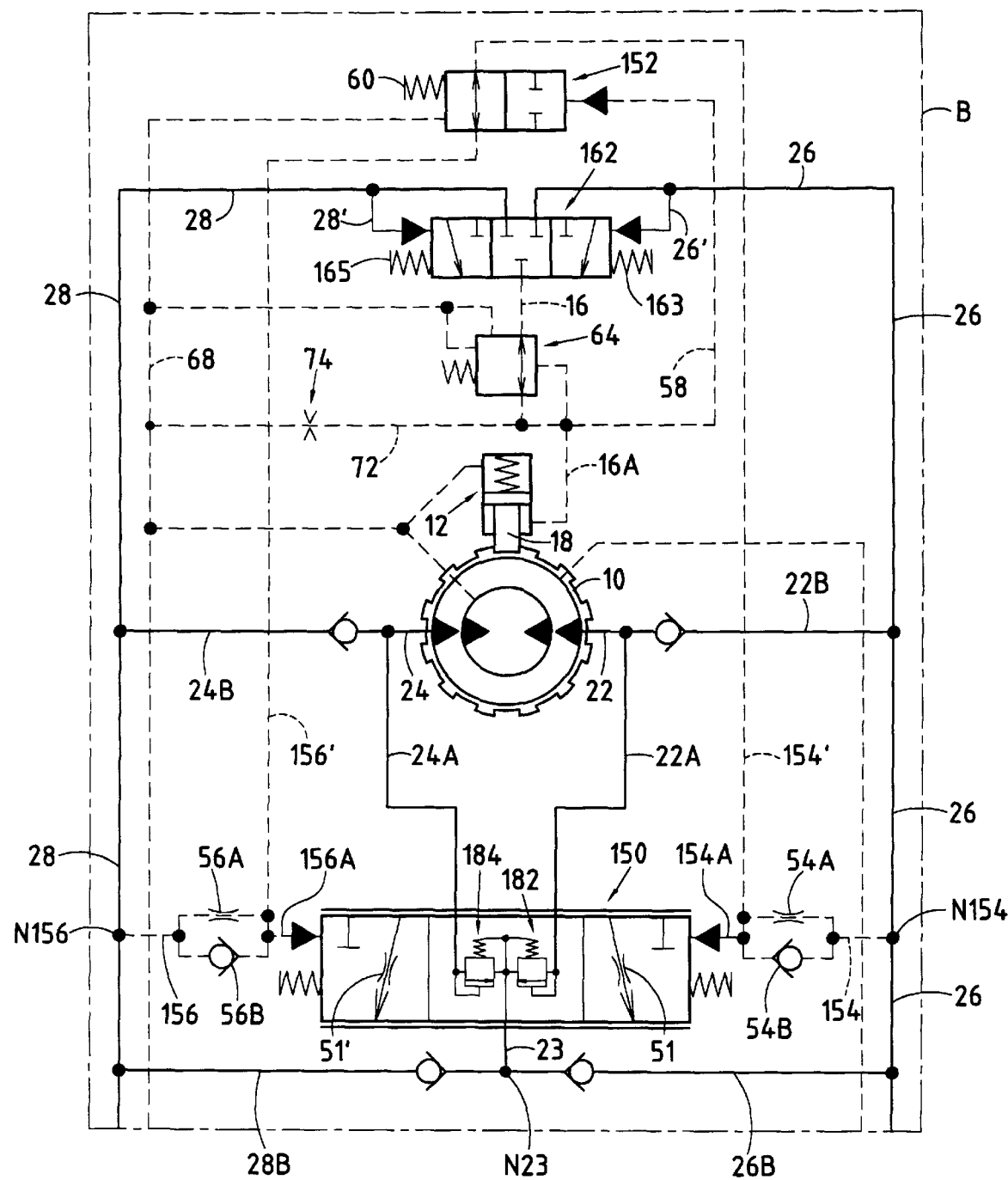

FIG. 2 will now be described, in which the elements similar to those of FIG. 1 have conserved the same references. Furthermore, only the elements of unit B have been shown in FIG. 2.

FIG. 2 differs from FIG. 1, firstly in the intermediate system of selection. In effect, in FIG. 2, this system comprises an intermediate selector 152 which is capable of occupying a first position (visible in FIG. 2) in which the two pilot conduits 154 and 156 are placed in communication, as well as a second position in which they are isolated from one another and are respectively connected, conduit 154 to the first principal conduit 26 and conduit 156 to the second principal conduit 28.

More precisely, in FIG. 2, the pilot conduits 154 and 156 are respectively connected permanently to the principal conduits 26 and 28 by nodes N154 and N156 respectively. These conduits are provided with the assemblies of valves and restrictions 54A, 54B, 56A and 56B described previously. A by-pass loop comprises a first conduit 154' which connects the first pilot conduit 154 to an inlet of the selector 152 and a second conduit 156' which connects the second pilot conduit 156 to another inlet of the selector 152. In this way, in the first position of the intermediate selector 152, the conduits of the by-pass loop 154' and 156' are placed in communication, with the result that the pressures in the sections of conduits 154A and 156A of the pilot conduits 154 and 156 are equal, which causes the principal selector 150 to occupy its position of rest. The sections 154A and 156A lie, in the sense of supply of the pilot conduits, downstream of the connection of conduits 154' and 156' to conduits 154 and 156 respectively, this connection itself being downstream of the restrictions 54A and 56A.

Similarly to FIG. 1, the intermediate selector 152 is permanently returned towards its first position by a spring 60. It is urged towards its second position by the fluid circulating in the control conduit 58 connected to the de-activation conduit 16 of the immobilization device 12, as in FIG. 1. In addition, the pressure reducer 64 and the draining conduit 72 are similar to those shown in FIG. 1. The springs 20 and 60 are chosen in the same manner as in FIG. 1.

Thus, in the same way as for FIG. 1, the circuit comprises means for limiting the pressure in the section 16A of the de-activation conduit 16 and this conduit is capable of being connected to one or the other of the principal conduits 26 and 28 by selective communication means. However, in FIG. 2, the shuttle valve 62 is replaced by a three-position selector 162. It comprises two inlets, respectively connected to conduits 26 and 28 and an outlet connected to conduit 16. In its intermediate position of rest shown in FIG. 2, it isolates conduit 16 from conduit 26 and from conduit 28. This selector is controlled between its three positions by the pressure of fluid in the conduits 26 and 28, on which pilot conduits 26' and 28' are connected, and by the antagonistic action of return springs 163 and 165. In this way, when the means for circulation of the fluid in the circuit are employed so that the conduit 26 serves for high-pressure supply, while conduit 28 is connected to exhaust, the selector 162 is displaced towards the left in FIG. 2 to occupy its first active position in which the conduit 16 is placed in communication with the principal supply conduit 26, so that the immobilization piston 18 is urged into inactive position.

In the other direction of operation of the motor, when conduit 28 serves for supply and conduit 26 for exhaust, the selector 162 is urged towards the right in FIG. 2, i.e. it occupies its second active position in which the conduit 28 serves to supply conduit 16 to urge the immobilization member into its inactive position. The return springs 163 and 165 may be calibrated so that the selector 162 is displaced, from its position of rest, towards one or the other of its active positions only when the pressure in that conduit 26 or 28 which is connected to conduit 16, is at least equal to a threshold pressure greater than the booster pressure. In this way, the selector 162 also performs the role of the threshold valve 70 of FIG. 1.

The principal selector 150 is different from the selector 50 of FIG. 1 insofar as it integrates the valves which make it possible to avoid the excess pressures in the by-pass conduits 22A and 24A. More precisely, it comprises two valves 182 and 184, respectively located between conduit 22A and conduit 23 between conduit 24A and conduit 23.

Figure 3:
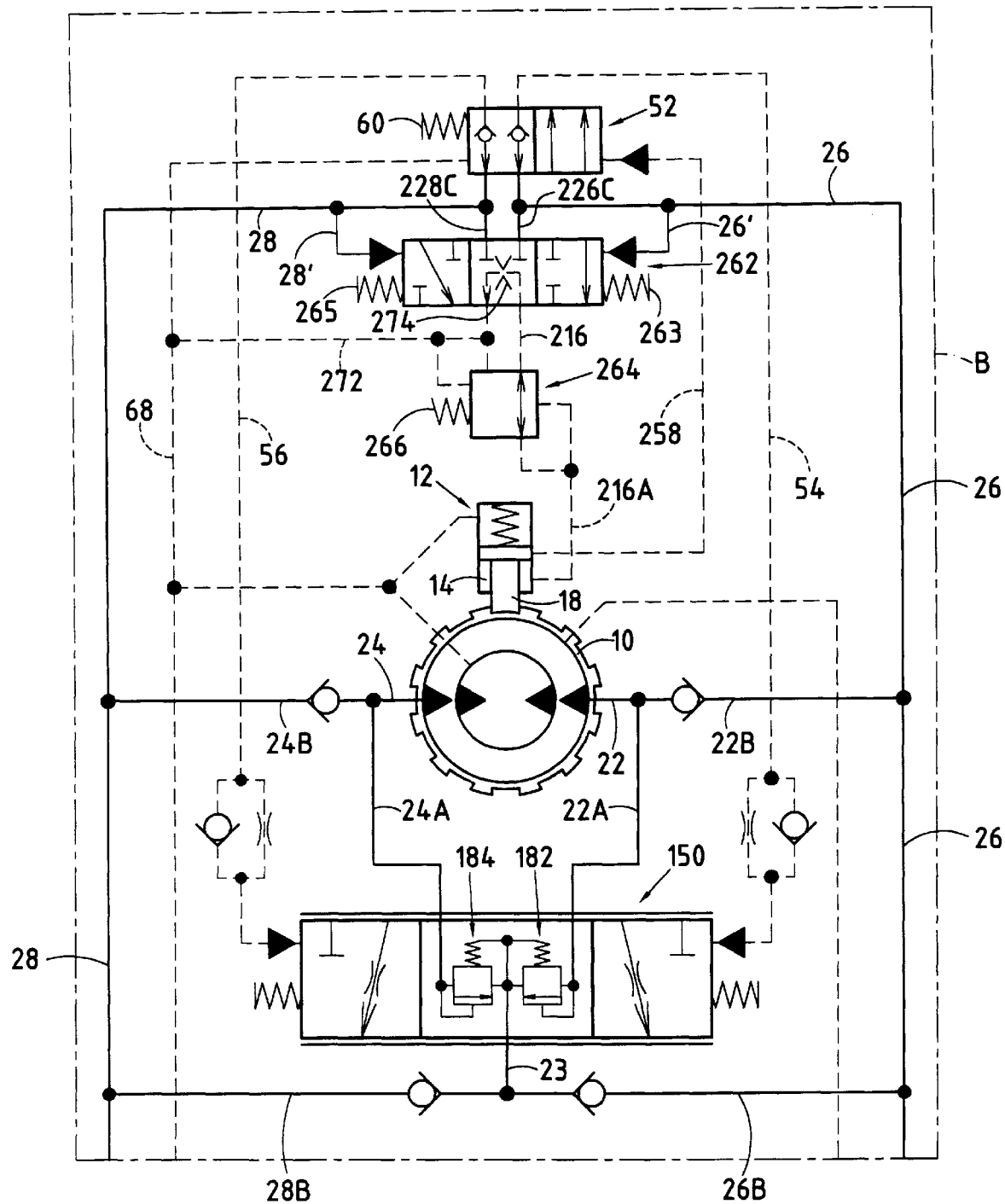

FIG. 3 will now be described, in which the same references have been used as in FIG. 1 to designate similar elements in these two Figures. As in FIG. 2, only unit B has been shown. In FIG. 3, the principal selector 150 is the same as in FIG. 2 and the valves 182 and 184 are present. On the other hand, the intermediate selector 52 is the same as in FIG. 1 and the pilot conduits 54 and 56 are disposed between the selectors 52 and 150 in the same way as conduits 54 and 56 of FIG. 1 are disposed between the selectors 52 and 50. In FIG. 3, the control conduit 258 which serves to pass the intermediate selector 52 from its first position towards its second position is connected to the cylinder of the de-activation jack 12 so that it is effectively placed in communication with the de-activation conduit 216 only when the immobilization member 18 is remote from its active position by a determined distance. Thus, the conduit 258 is connected to the de-activation chamber 14 in a position such that it is isolated from this chamber as long as the immobilization member occupies its active position and it is necessary that the immobilization member be displaced sufficiently towards its inactive position for this conduit 258 to open out effectively in chamber 14 without being obstructed and thus to allow the fluid entering in this chamber via section 261A of conduit 216 to supply the selector 52.

The selector 262 of FIG. 3 is capable of occupying three positions. It is connected, on the one hand, to the principal conduits 26 and 28 by branches 226C and 228C of these conduits and, on the other hand, to the de-activation conduit 216 and to the draining conduit 272. In its intermediate position of rest shown in FIG. 3, the selector 262 isolates the principal conduits 26 and 28 from each other and communicates together the conduits 216 and 272 that it isolates from conduits 26 and 28.

Consequently, in this position, the de-activation chamber 14 is not supplied by conduits 26 or 28, but it may be drained via conduit 216 and conduit 272. A pressure reducer 264 is also placed on conduit 216, the section 216A of this conduit lying downstream of this pressure reducer. When the pressure in the section 216A is less than the pressure for which its return spring 266 is calibrated, this pressure reducer communicates said section 216A with conduit 272 via the selector 262. This is in particular the situation when the motor is stopped. On the other hand, if, when the motor is operating, the pressure in the section 216A of the conduit 216 becomes too high, the pressure reducer 264 may place section 216A and conduit 272 directly in communication, independently of the position of the selector 262, which makes it possible to limit the pressure in the chamber 14.

The selector 262 is controlled between its position of rest and one or the other of its active positions as a function of the pressure in the conduits 26 and 28, by pilot conduits 26' and 28'. In this way, when the fluid circulates so that the conduits 26 and 28 serve respectively for supply and exhaust, the high pressure of the conduit 26 urges the selector 262 towards the left in FIG. 3, so that it occupies its first active position in which the conduit 216 is connected to conduit 26, with the result that chamber 14 may be supplied with fluid, while conduits 28 and 272 are isolated from one another. The conduits 216 and 272 are then likewise isolated and may only communicate via the pressure reducer 264. When it is conduit 28 which serves for supply, the selector 262 is displaced towards the right in FIG. 3 to occupy its second active position in which the conduit 28 is connected to conduit 216 in order to supply chamber 14, while conduits 26 and 272 are isolated. Similarly, conduits 216 and 272 may then only communicate via the pressure reducer 264.

It will be understood that, from the position of rest of FIG. 3, when the pressure increases in one of the principal conduits 26 and 28, the selector 262 is displaced towards one or the other of its two active positions in order to supply the de-activation conduit 216. Then, taking into account the particular connection of the conduit 258 shown by way of variant in FIG. 3, this conduit can be supplied with flud only when the immobilization member 218 will be sufficiently displaced towards its inactive position (i.e. when the brake plates will have stopped being in contact against one another or when the two parts of the positive clutch will have been disengaged). In that case, the intermediate selector 52 may be displaced towards its second position, by respectively connecting the pilot conduits 54 and 56 to the principal conduits 26 and 28 in order to control displacement of the principal selector 150 towards one or the other of its two active positions and to allow the exhaust of fluid from the motor via that by-pass conduit 22A or 24A which is connected to the principal conduit which has the lowest pressure.

It should be emphasized here that the selector 262 constitutes a means for allowing draining of the de-activation chamber 14 by the draining conduit 272 only when the de-activation conduit 216 is isolated from the principal conduits 26 and 28. In this way, contrary to the circuit of FIGS. 1 and 2, the circuit of FIG. 3 avoids the necessity of being able to drain the de-activation chamber being the cause of permanent leakages. In effect, it is only when the selector 262 occupies its intermediate position that conduit 216 is connected to conduit 272 for a long duration. It is therefore only in that case that draining of chamber 14 will be possible. During operation of the motor, the pressure reducer 264 may possibly be able to allow, nonetheless, a momentary connection of the chamber 14 to conduit 272, while conduit 216 is connected to one of conduits 26 and 28, but such momentary connection will serve only to limit the pressure in the chamber 14, without allowing the latter to be drained, the immobilization member 18 in that case continuing to occupy its active position.

The three-position selector 262 therefore constitutes a drain selection valve which, when the fluid pressures in the principal conduits 26 and 28 are substantially equal, occupies its position of rest or position of draining in which the de-activation conduit 216 is connected to the draining conduit 272 and isolated from the principal conduits 26 and 28. The first and second operational positions of this valve 262 have already been described. If the pressure reducer 264 were absent, the conduit 216 would be totally isolated from conduits 26 and 28 in the two operational positions of the valve 262. As indicated hereinabove, due to the possible presence of this pressure reducer 264, the conduit 216 remains isolated from conduits 26 and 28 as long as the pressure in the section 216A of conduit 216 remains less than a predetermined maximum pressure.

In FIG. 3, the circuit also comprises means for limiting the flowrate of fluid circulating in the draining conduit 272. In the example shown, these means are constituted by a restriction 274 which is disposed on the branch of the valve 262 which serves to place in communication conduits 216 and 272 in position of draining of this valve. Furthermore, the springs 263 and 265 for returning the valve against, respectively, supply by conduit 28 and supply by conduit 26, may be calibrated, with the result that they effectively allow the displacement of this valve towards one or the other of its operational positions from its position of draining, only when the pressure in that conduit 26 or 28 which is connected to supply, is at least equal to a given pressure. In this way, the drain selection valve 262 of FIG. 3 comprises the means for selectively placing in communication the de-activation conduit 216 with one or the other of the conduits 26 and 28, the threshold valve and the means for limiting the flowrate of fluid circulating in the draining conduit 272.

Figure 4:
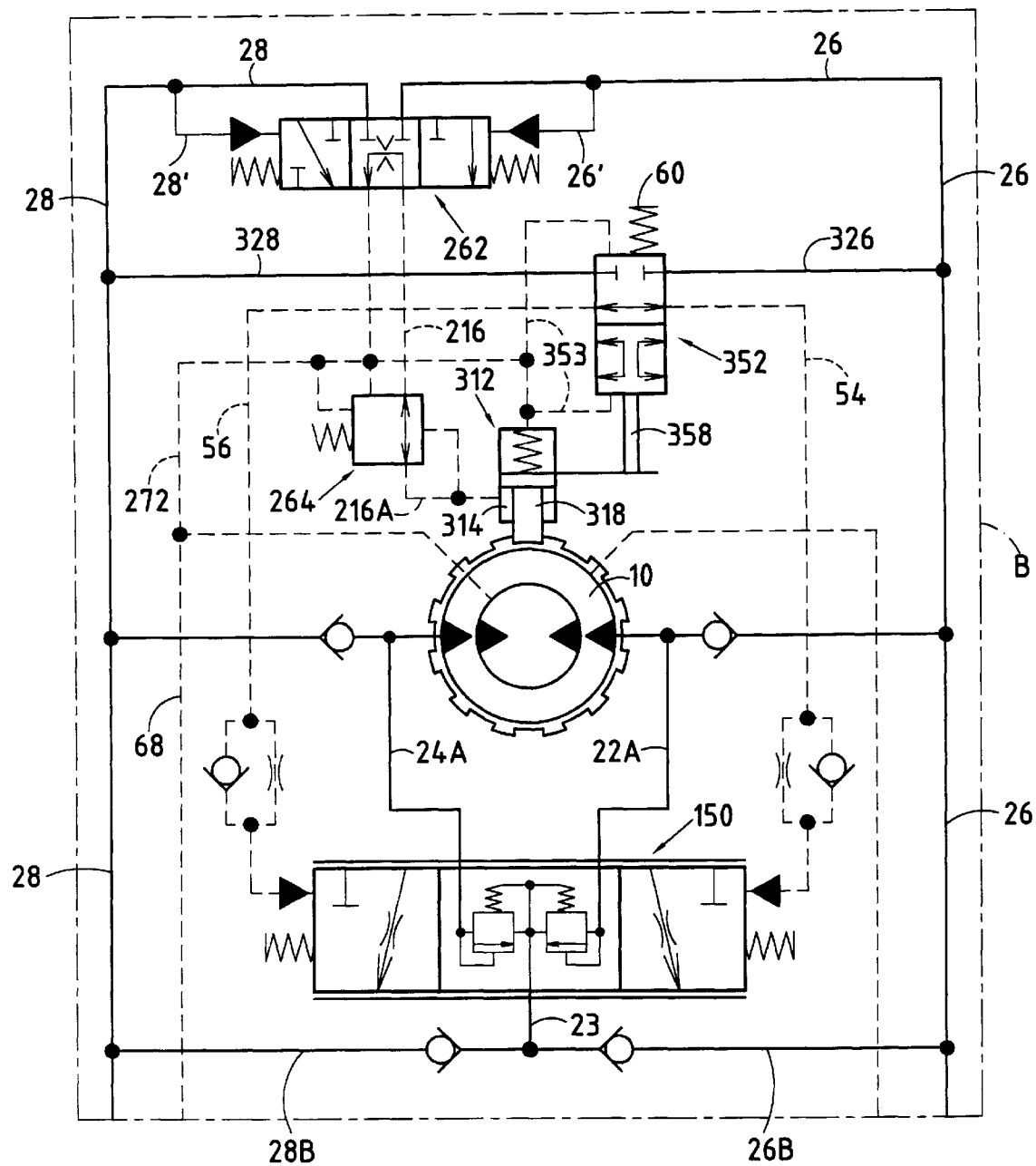

FIG. 4 will now be described, in which elements similar to those of FIG. 1 are given the same references as in that Figure. The principal selector 150 is the same as those of FIGS. 2 and 3. The draining valve 262 is similar to that of FIG. 3. In effect, depending on the position that it adopts, it serves to connect the de-activation conduit 216 to the draining conduit 272 by isolating these two conduits from conduits 26 and 28, or to connect conduit 216 to that of conduits 26 and 28 which is at the higher pressure in order to supply the de-activation chamber 314 of the de-activation device 312. The differences between the circuit of FIG. 4 and those of the preceding Figures reside principally in the conformation of the secondary selector 352 of the circuit of FIG. 4 and in the mode of controlling displacement of the latter between its two positions.

FIG. 4 shows the secondary selector 352 in its first position, in which, as was the case for the selector 152 of FIG. 2, the two pilot conduits 54 and 56 are placed in communication. The principal conduits 26 and 28 are also connected to the inlet of the selector 352 by branches 326 and 328. In its first position, the selector 352 isolates these two branches from each other, at the same time as isolating the pilot conduits 54 and 56 from these two principal conduits 26 and 28.

On the other hand, when the secondary selector 352 occupies its second position, it connects the first pilot conduit 54 to the first principal conduit 26 by branch 326 and the second pilot conduit 56 to the second principal conduit 28 by branch 328. In this way, contrary to the variant of FIG. 2, the two pilot conduits 54 and 56 are not permanently connected respectively to the conduits 26 and 28, but only when the intermediate selector occupies its second position.

In FIG. 4, the intermediate system of selection is not controlled hydraulically but mechanically. In this way, the control means of this intermediate system comprise at least one control member which is mechanically connected to the immobilization member 318 and which is capable of being actuated by this immobilization member in order to urge the intermediate system of selection from its first configuration towards its second configuration. In the present case, the control means of the intermediate selector 352 comprise a control rod 358 which is connected to the immobilization member 318. In this way, when the latter passes from its active position shown in FIG. 4 to its inactive position allowing the motor to function, it urges the rod 358 which places the selector 352 in its second position.

On the other hand, when the de-activation chamber 324 is drained via conduit 272 and the immobilization member returns into its active position, it urges the rod 358 which, possibly aided by the permanent return spring 60, controls the selector 352 into its first position. Conduits 353 for return of leakage of selector 352 are connected to exhaust 68.

When, from the situation shown in FIG. 4, the pressure increases in one of the principal conduits 26 or 28 (the one which is connected to supply), the valve 262 is controlled (pilot conduits 26' and 28') towards one of its operational positions, which allows the connection of the de-activation conduit 216 with the conduit 26 or 28 at high pressure and supply of fluid to chamber 314, with the result that the immobilization member 318 moves towards its inactive position. Consequently, the selector 352 occupies its second position and respectively connects the conduits 54 and 56 to conduits 26 and 28. The pilot conduits connected to the principal conduit at high pressure then urges the selector 150 towards its first or its second active position and the motor may function normally, exhaust being effected by that of conduits 22A and 24A which is connected to conduit 23.

Figure 5:
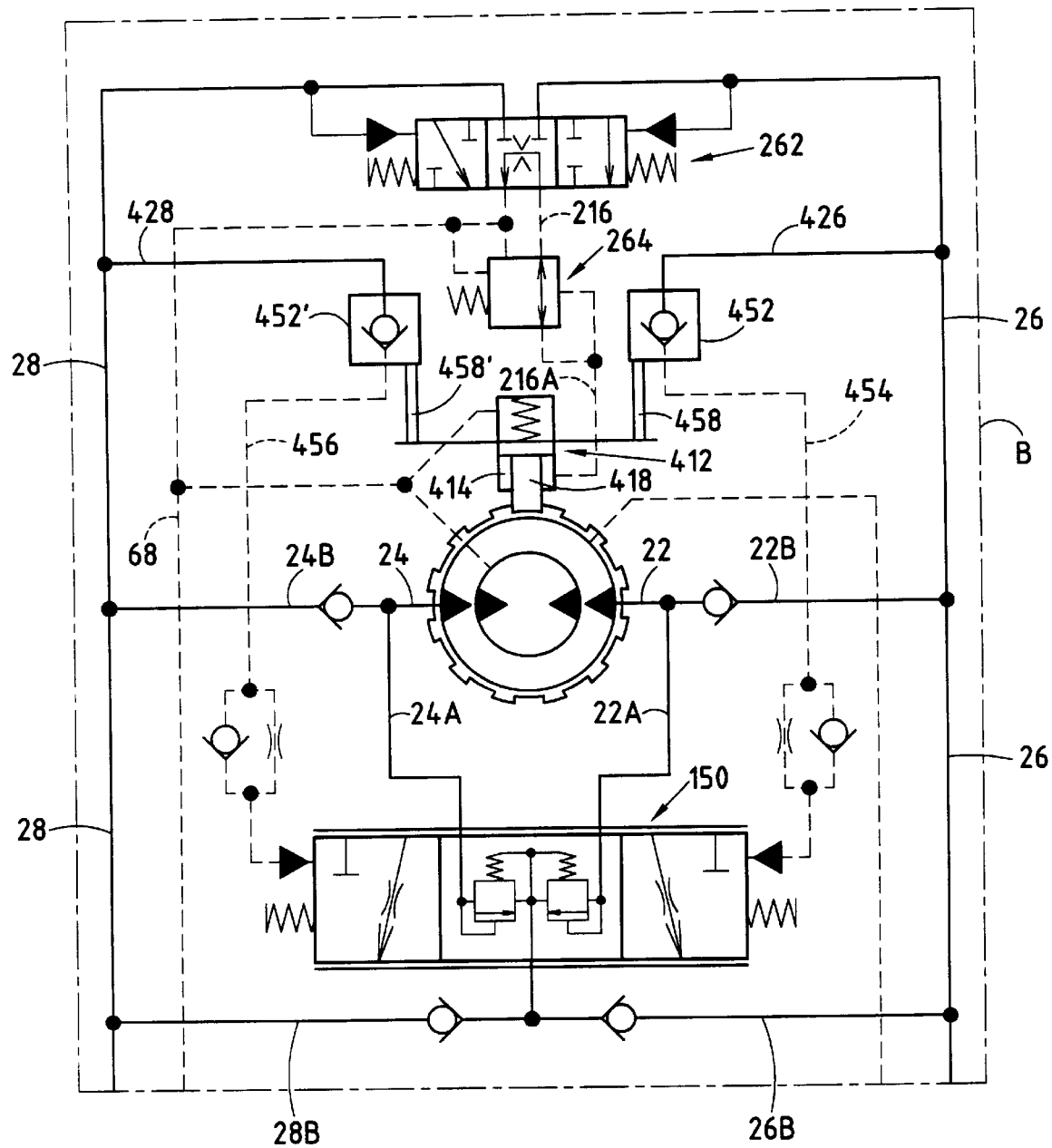

FIG. 5 will now be described, in which the elements which are the same as in FIG. 1 conserve the same references. The principal selector 150 is similar to that of FIGS. 2 to 4. This time, the intermediate system of selection is made differently, since it comprises a first valve 452 and a second valve 452' respectively disposed between the first principal conduit 26 (by branch 426 of the latter) and the first pilot conduit 454 and between the second principal conduit 28 (by branch 428 of the latter) and the second pilot conduit 456. In this way, the pilot conduits 454 and 456 are not directly connected together. The valves 452 and 452', when they are not subjected to the action of the control means which will be described hereinafter, i.e. when they occupy their first positions, only allow the circulation of fluid in the direction going from the pilot conduits towards the respective principal conduits, by cutting off circulation of fluid of the principal conduits towards the pilot conduits. On the other hand, when they are controlled to occupy their second positions, the valves 452 and 452' allow the circulation of fluid in the two directions between, for valve 452, conduits 26 and 454 and, for valve 452', conduits 28 and 456.

In the example shown in FIG. 5, the means for controlling the displacement of valves 452 and 452' towards their second positions are mechanical. In effect, they comprise two control rods 458 and 458' respectively, which are mechanically connected to the immobilization member 418 of the immobilization device 412.

The drain selection valve 262 is similar to that of FIGS. 3 and 4. Similarly, the de-activation conduit 216 is connected in the same manner as in FIGS. 3 and 4 and the pressure reducer 264 is similar to those of FIGS. 3 and 4.

When, from the position of FIG. 4, the pressure increases in that of conduits 26 or 28 which is connected to supply, the de-activation chamber 414 of the de-activation device 412 is supplied with fluid via the section 216A of the conduit 216, with the result that the immobilization member 418 is displaced towards its inactive position and then urges the valves 452 and 452' simultaneously towards their second positions thanks to the control rods 458 and 458'. Of course, hydraulic control means for the valves might also be provided. Such displacement allows that of conduits 26 and 28 which is at high pressure, to supply fluid to the pilot conduit 454 or 456 to which it is connected in order thus to control the displacement of selector 150 towards one or the other of its two active positions and allow exhaust via conduit 22A or 24A.

It has been seen that, during operation of the motor, in order to avoid the phenomena of cavitation, the exhaust conduit is connected to the booster pump. Consequently, when the motor is stopped, the pressures in the two principal conduits are stabilized at the booster pressure. The valves 452 and 452' occupying their first positions under the effect of the displacement of the immobilization member 418 towards its active position, that of the pilot conduits which was connected to the principal exhaust conduit remains at booster pressure, while the pressure of the other pilot conduit (which was connected to the principal supply conduit) decreases until it attains the booster pressure since the fluid may circulate from this pilot conduit towards the principal conduit to which it is connected. In this way, the selector 150 is automatically replaced towards its position of rest when the motor is stopped.

The behaviour of the circuit of FIGS. 1 and 3 during a stop of the motors is similar, since, in the first position of the selector 52, the circulation of fluid is possible only in the direction going from the pilot conduits towards the principal conduits to which they are respectively connected. In FIGS. 2 and 4, the stop of the motor and therefore the passage of the immobilization member towards its inactive position urge the selector 152 or 352 so that it directly communicates the pilot conduits 54 and 56 or 154 and 156, which rapidly places the principal selector 150 in its intermediate position of rest.

In the Figures, the selectors 50 or 150 may occupy an infinite number of intermediate positions of passage corresponding to variable degrees of restriction of the flow. However, it is seen in the Figures that restrictions 51 and 51' are made on the inner conduits of the selector 50 or 150 which serve to place one or the other of conduits 22A and 24A in communication with the exhaust. In this way, the selector 50 or 150 includes means for limiting the flowrate of fluid circulating in the second principal conduit when this selector occupies its first active position (the second principal conduit is in that case connected to exhaust) and in order to limit the flowrate of fluid circulating in the first principal conduit when the selector occupies its second active position (the first principal conduit is in that case connected to exhaust). In this way, the flowrate of fluid through the selector 50 or 150 is continuously variable up to a predefined maximum flowrate. Due to the presence of these flowrate limiters, the principal selector also performs the role of speed limiter for the motor.

What is claimed is:

1. Hydraulic fluid circuit comprising:
   a hydraulic motor with two directions of rotation, comprising a stator and a rotor, in particular of the type used for driving the members for displacing a machine in translation, said motor having two principal ports respectively intended to serve for supply and exhaust of fluid,
   a device for immobilization of the rotor of the motor which comprises at least one immobilization member and means for urging said member into an active position in which the rotor is immobilized and into an inactive position in which the rotor is free to rotate with respect to the stator,
   hydraulic fluid circulation means,
   two principal conduits, respectively intended to be connected to each of the two principal ports of the motor to serve as supply and exhaust conduits for the motor when the latter is in operation,
   a device for selecting the circulation of the fluid between the principal ports of the motor and the principal conduits to which they are respectively connected, this device comprising a principal selector capable of occupying a rest position in which, the fluid pressures in the principal conduits being substantially equal, the circulation of fluid between the principal conduits and the corresponding principal ports is prevented in the sense of exhaust; a first active position in which, the fluid pressure in the first principal conduit being greater than the fluid pressure in the second principal conduit, the circulation of fluid between the first principal conduit and the first principal port is allowed in the sense of supply while the circulation of fluid between the second principal conduit and the second principal port is allowed in the sense of exhaust; and a second active position in which, the fluid pressure in the first principal conduit being less than the fluid pressure in the second principal conduit, the circulation of fluid between the first principal conduit and the first principal port is allowed in the sense of exhaust while the circulation of fluid between the second principal conduit and the second principal port is allowed in the sense of supply, the selection device further comprising means for controlling the displacement of the principal selector between its three positions, wherein the means for controlling displacement of the principal selector comprise an intermediate system of selection capable of adopting a first configuration in which the principal selector is maintained in its position of rest and a second configuration in which the principal selector is allowed to leave its position of rest to adopt one or the other of its active positions, as well as two pilot conduits capable of being taken to the same pressure or to different pressures via the intermediate system of selection, the means for controlling the displacement of the principal selector further comprising means for controlling the intermediate system of selection which are connected to the immobilization device so that said intermediate system of selection is allowed to pass from its first to its second configuration only once the immobilization member has been urged towards its inactive position.

2. The circuit of claim 1, wherein the intermediate system of selection comprises an intermediate selector capable of occupying a first position in which the circulation of fluid in the pilot conduits is cut off, at least in the sense of supply of said conduits with fluid, and a second position in which the first and the second pilot conduits are respectively connected to the first and second principal conduits, the first and second configurations of the intermediate system of selection being respectively obtained when the intermediate selector occupies its first and second positions respectively.

3. The circuit of claim 1, wherein the intermediate system of selection comprises an intermediate selector capable of occupying a first position in which the two pilot conduits are placed in communication and a second position in which the first and the second pilot conduits are isolated from each other and are respectively connected to the first and second principal conduits, the first and second configurations of the intermediate system of selection being respectively obtained when the intermediate selector occupies its first and second positions respectively.

4. The circuit of claim 3, wherein, in its first position, the intermediate selector isolates the two pilot conduits from the principal conduits.

5. The circuit of claim 2, wherein the intermediate selector is urged towards its first position by first permanent elastic return means.

6. The circuit of claim 5, wherein the immobilization member is urged towards its active position by second permanent elastic return means and said first and second permanent elastic return means are chosen so that the stresses exerted by the first permanent elastic return means on the intermediate selector when the latter begins to be urged from its first towards its second position, are at least equal to the stresses exerted by the second permanent elastic return means on the immobilization member during the whole stroke of the latter from its active position to its inactive position.

7. The circuit of claim 1, wherein the intermediate system of selection comprises a first and a second flap valve, respectively disposed between the first principal conduit and the first pilot conduit, and between the second principal conduit and the second pilot conduit, each of these valves being capable of adopting a first position in which it cuts off the circulation of fluid from the first principal conduit towards the first pilot conduit, and from the second principal conduit towards the second pilot conduit, respectively, and a second position in which it allows the circulation of fluid in the two directions between the first principal conduit and the first pilot conduit, and between the second principal conduit and the second pilot conduit, respectively, the first configuration of the intermediate system of selection being obtained when the two valves occupy their first positions, while the second configuration of said system is obtained when the two valves occupy their second positions.

8. The circuit of claim 1, wherein the means for controlling the intermediate system of selection comprise at least one control conduit capable of being supplied with fluid in order to urge the intermediate system of selection from its first configuration into its second configuration.

9. The circuit of claim 8, in which the means for urging the immobilization member into its inactive position comprise a de-activation jack capable of being supplied with fluid by a de-activation conduit, wherein the control conduit is capable of being supplied with fluid via the de-activation conduit.

10. The circuit of claim 9, wherein the control conduit is connected to the cylinder of the de-activation jack so that said control conduit is effectively placed in communication with the de-activation conduit only when the immobilization member is remote from its active position by a determined distance.

11. The circuit of claim 1, wherein the means for controlling the intermediate system of selection comprise at least one control member, mechanically connected to the immobilization member and capable of being actuated by said immobilization member in order to urge the intermediate system of selection from its first configuration into its second configuration.

12. The circuit of claim 1, in which the means for urging the immobilization member into its inactive position comprise a de-activation jack capable of being supplied with fluid by a de-activation conduit, wherein it comprises means for limiting the pressure in the de-activation conduit and said de-activation conduit is capable of being connected to one or the other of the principal conduits by selective communication means such as a shuttle valve.

13. The circuit of claim 1, in which the means for urging the immobilization member into its inactive position comprise a de-activation jack capable of being supplied with fluid by a de-activation conduit and in which, when the motor is stopped, the principal conduits are capable of being put at the same, so-called "booster" pressure, wherein it comprises a threshold valve which is intended to allow the circulation of fluid in the de-activation conduit in the direction going from one of the principal conduits towards the de-activation chamber, only when the pressure in one of the principal conduits becomes greater than a threshold pressure, at least equal to the booster pressure.

14. The circuit of claim 1, in which the means for urging the immobilization member into its inactive position comprise a de-activation jack having a deactivation chamber capable of being supplied with fluid by a de-activation conduit, wherein it comprises a conduit for draining the de-activation chamber and means for limiting the flowrate of fluid in said conduit during draining of said chamber.

15. The circuit of claim 1, in which the means for urging the immobilization member into its inactive position comprise a de-activation jack having a deactivation chamber capable of being supplied with fluid by a de-activation conduit, wherein it comprises a conduit for draining the de-activation chamber and means for allowing draining of the de-activation chamber by this conduit only when the de-activation conduit is isolated from the principal conduits.

16. The circuit of claim 15, wherein it comprises a drain selection valve capable of occupying a draining position in which, the fluid pressures in the principal conduits being substantially equal, the de-activation conduit is connected to the draining conduit and is isolated from the principal conduits, a first operational position in which, the pressure in the first principal conduit being greater than the pressure in the second principal conduit, the de-activation conduit is connected to the first principal conduit and remains isolated from the draining conduit and from the second principal conduit, and a second operational position in which, the pressure in the first principal conduit being lower than the pressure in the second principal conduit, the de-activation conduit is connected to the second principal conduit and remains isolated from the drawing conduit and from the first principal conduit.

17. The circuit of claim 16, wherein it comprises a pressure reducer intended, in the first and second positions of the drainage selection valve, to allow a connection of the de-activation chamber to the draining conduit when the pressure in said chamber attains a given, so-called "maximum de-activation" pressure.

18. The circuit of claim 15, wherein it comprises means for limiting the flowrate of fluid circulating in the draining conduit.

19. The circuit of claims 12, 13, 16 and 18, wherein the drain selection valve comprises the means for selective communication, the threshold valve and the means for limiting the flowrate of fluid circulating in the draining conduit.

20. The circuit of claim 1, wherein the principal selector includes means for limiting the flowrate of fluid circulating in the second principal conduit when said selector occupies its first active position and for limiting the flowrate of fluid circulating in the first principal conduit when this selector occupies its second active position.

* * * * *